Jan. 5, 1965
M. J. LUGASH
3,164,398
SEMI-TRAILER COUPLING UNIT
Filed Aug. 20, 1962
2 Sheets-Sheet 1
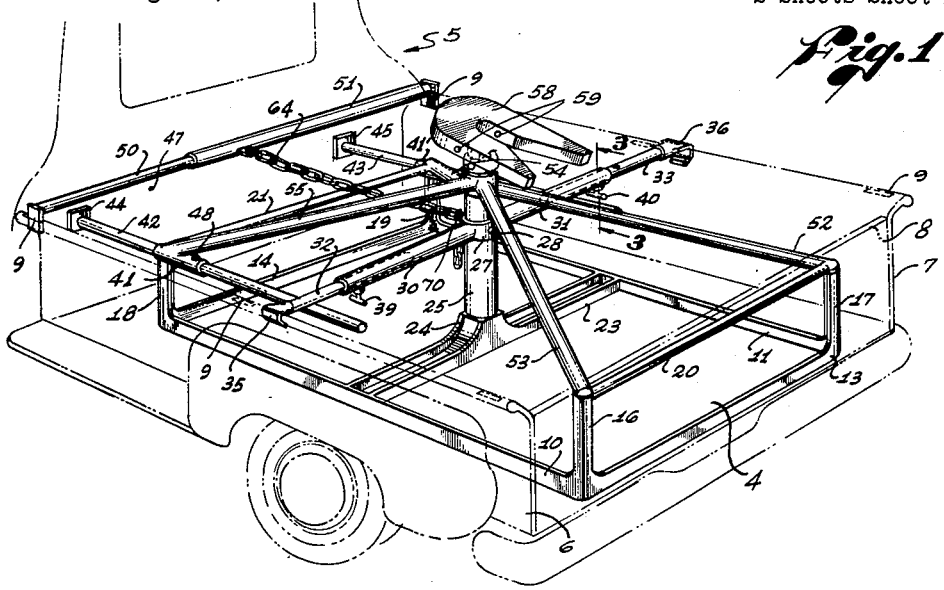
Fig.1
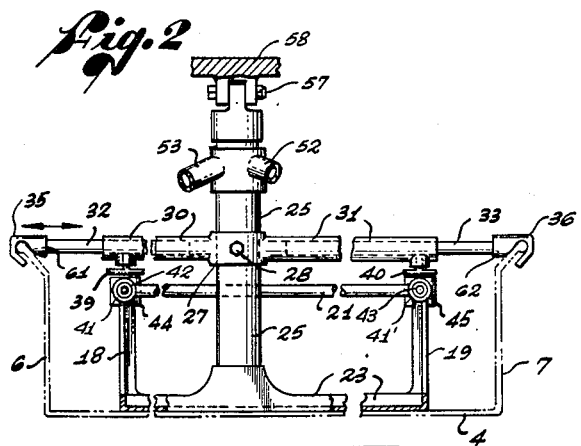
Fig.2
Fig.3
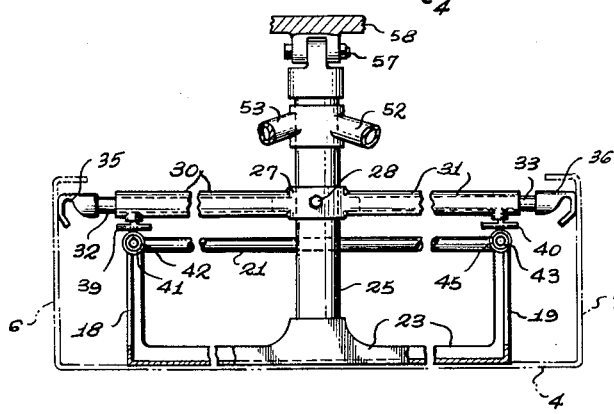
Fig.4
INVENTOR.
MAX J. LUGASH
BY
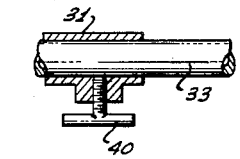
ATTORNEY Jan. 5, 1965   M. J. LUGASH   3,164,398
SEMI-TRAILER COUPLING UNIT
Filed Aug. 20, 1962   2 Sheets-Sheet 2
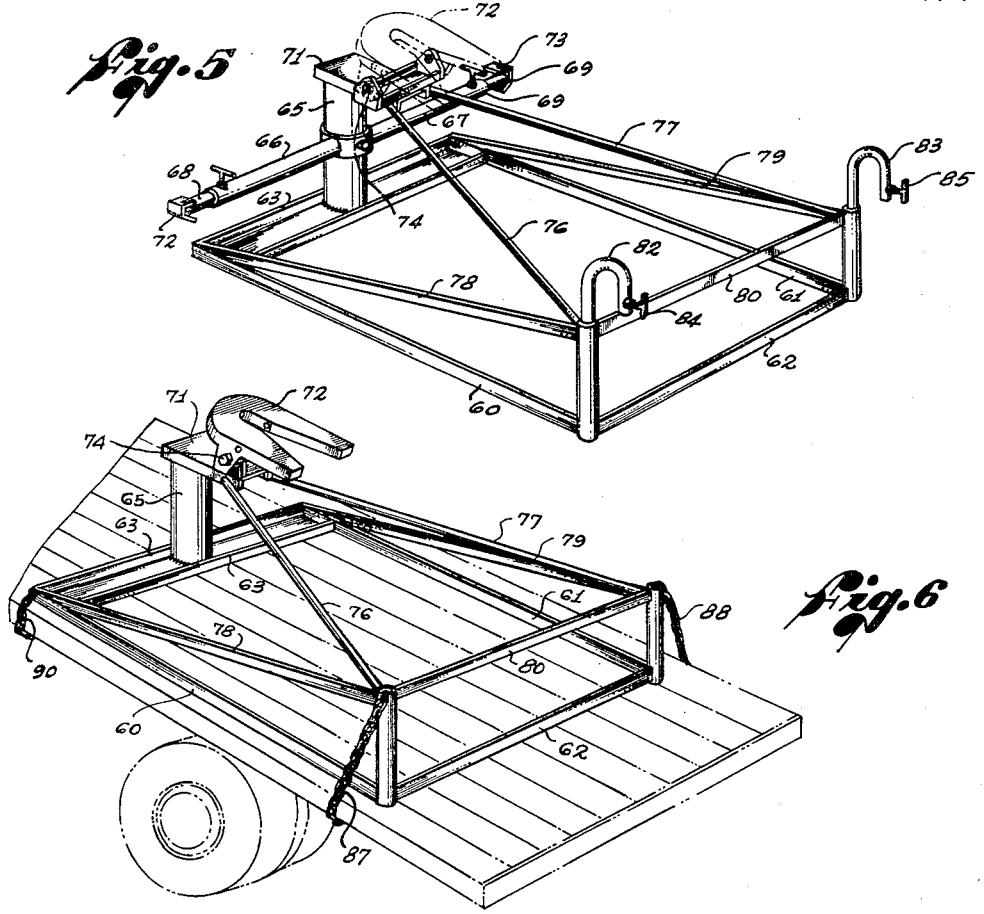
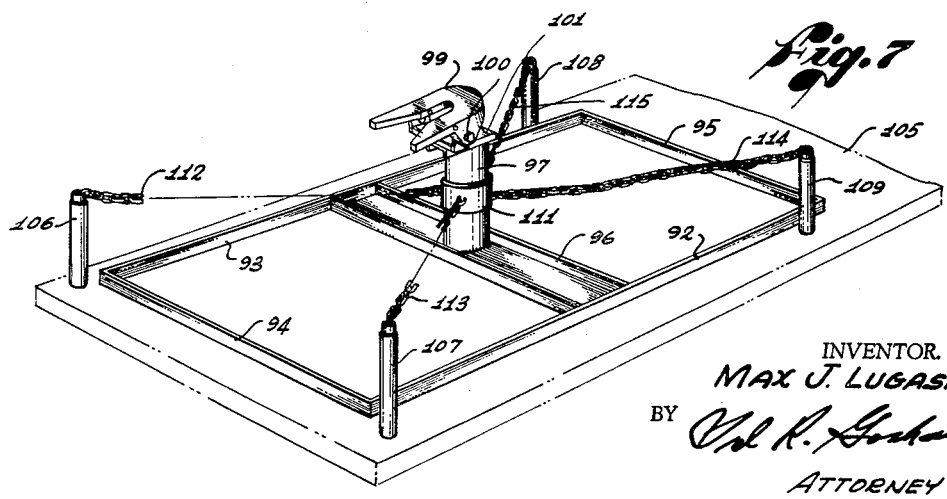
INVENTOR.
MAX J. LUGASH
BY
ATTORNEY 3,164,398
SEMI-TRAILER COUPLING UNIT
Max J. Lugash, Los Angeles, Calif., assignor to Maxon Industries, Inc., Los Angeles, Calif., a corporation of California
Filed Aug. 20, 1962, Ser. No. 217,854
10 Claims. (Cl. 280—423)

This invention relates to a portable attachment to a vehicle to permit the coupling thereof to a trailer, particularly a semi-trailer.

The use of semi-trailers whereby the front end thereof may be coupled by a "fifth wheel" type of connection to a power source is well known. The present invention is directed to an adjustable frame which may be quickly attached to and detached from the flat beds and/or side panels of pickup trucks varying in size and which permits the pickup trucks to serve as the power vehicle for a semi-trailer in the same manner as the standard power cab. The framework is simple and economical in construction and permits a pickup truck to serve not only in its normal capacity as a pickup truck but as the motive power for various sizes of semi-trailers.

The principal object of the invention, therefore, is to facilitate the adaptation of a pickup truck as motive power for semi-trailers.

Another object of the invention is to provide an improved portable coupling structure for connecting semi-trailers to pickup trucks of different sizes.

A further object of the invention is to provide a portable coupling unit between a pickup truck and a semi-trailer which is easily attachable to and detachable from pickup trucks of different sizes.

A better understanding of this invention may be had from the following description when read in conjunction with the accompanying drawings, in which:

FIG. 1 is a perspective view of one embodiment of the invention shown attached to a pickup truck;

FIG. 2 is an elevational view showing the attachment of the invention to one type of side panel of a pickup truck;

FIG. 3 is a detail view taken along the line 3—3 of FIG. 1;

FIG. 4 is a side elevational view showing the attachment of the invention to another type of side panel of a pickup truck;

FIG. 5 is a perspective view of another modification of the invention;

FIG. 6 is a perspective view of another modification of the invention for use on flat bed pickup trucks; and FIG. 7 is a perspective view of another modification of the invention for use on stake bed pickup trucks.

Referring, now, to the drawings in which the same numerals identify the same elements, the bed 4 of a pickup truck shown generally at 5 has side panels 6 and 7 with stake holes 9 therein and an end gate 8. The coupling unit has a rectangular frame resting on the bed 4, the frame having side members 10 and 11 and end members 13 and 14. From the corners of the frame, risers 16, 17, 18 and 19 extend, risers 16 and 17 being connected by a member 20 and risers 18 and 19 being connected by a member 21. Midway between end frame members 13 and 14 and attached to side members 10 and 11, is a standard supporting member 23, which may be U-shaped, with a pedestal 24 for supporting a standard 25.

Adjustably attached to the upper portion of standard 25 is a cross member having a collar 27 with a set screw 28 and tubular sections 30 and 31. Telescopically mounted in the ends of sections 30 and 31 are rods 32 and 33, respectively, rod 32 having an end hook 35, and rod 33 having an end hook 36. Therefore, with set screw 28, the height of members 30, 31, 32, and 33 may be adjusted, while set screws 39 and 40 permit the distance between hooks 35 and 36 to be adjusted. The frame is, thus, adjustable to different heights of the side panels 6 and 7 and to their distance of separation.

To obtain adjustability lengthwise of the truck bed frame, the upper ends of risers 18 and 19 have tubular cross members 41 and 41' into which are telescoped rods 42 and 43, respectively, with end bumpers 44 and 45. After the bumpers have contacted the front end panel 47 of the truck, set screws such as shown at 48 are tightened, the rear end of the frame abutting the rear truck panel or end gate 8.

For additional support for the standard 25, four braces 52, 53, 54, and 55 extend from the top end thereof to the upper ends of the frame risers. Hinged by a bolt 57 is a "fifth wheel" plate 58 which is locked to the coupling bolt of a semi-trailer by a pin passing through holes 59.

To provide an increased pulling connection between the truck and trailer, a pair of telescoping rods 50 and 51 have right angle end flanges which are accommodated in side panel holes 9. An adjustable chain 64 with a hook 70 connects the rods to the standard so that greater pulling strength is provided.

To connect the unit to a pickup truck, it is only necessary to place it inside the truck, extend the hooks 35 and 36 to the edges of the panels 6 and 7 and tighten the rods 32 and 33 in position by set screws 39 and 40, the latter being shown in detail in FIG. 3. If the hook rods are not at the proper level, collar 27 can be adjusted. The next step is to extend the rods 42 and 43 to the front panel of the truck bed and tighten them in position with the set screws. The telescoping rods 50 and 51 are then adjusted so their end flanges may be placed in holes 9. The chain 64 is then adjusted between the rods and standard 25. The pickup truck is then backed into a semi-trailer coupling kingpin and the pickup truck will provide the motive power for the trailer.

FIG. 4 shows a modification of the attachment of the transverse rods to the panels of a truck, the panels having internally directed flanges. In this instance, the hooks 35 and 36 abut the internal surfaces of the panels and maintain the connecting frame in fixed position crosswise of the truck.

Referring, now, to FIG. 5, a type of connector frame is shown in which the front portion of the frame, as shown in FIGS. 1, 2, and 4, is eliminated to permit the front portion of the pickup truck to be used for transporting material while at the same time providing the motive power for a semi-trailer.

The frame shown in FIG. 5 constitutes a base frame made up of side members 60 and 61 and end members 62 and 63, member 63 being a U-shaped member in which a standard 65 is positioned. To transversely position the frame in a pickup truck, telescoping tubes 66 and 67 contain rods 68 and 69, respectively, with hook members 72 and 73 to contact the panels of the pickup truck. In this modification, the top plate 71 for the "fifth wheel" unit 72 extends rearwardly and the wheel unit 72 is mounted on a bolt 74 positioned rearwardly of the standard 65. The plate 71 is supported by braces 76 and 77 in connection with braces 78, 79, and 80. By positioning the "fifth wheel" unit 72 rearwardly of standard 65, it is unnecessary to have any support forward of the standard 25. The connecting shock of the semi-trailer with the frame is such that it is directed at an angle to the standard and, therefore, has little tendency to raise the rear end of the frame. Furthermore, the rear end of the frame has telescoping hooks 82 and 83 with respective set screws 84 and 85 which fasten over the end gate of a panel pickup truck. This combination of attachment to the truck has been found to provide the necessary protection and permits a large tolerance of misalignment when connecting the semi-trailer to the truck.

Referring, now, to FIG. 6, the type of connection shown in FIG. 5 is utilized except instead of the hooks 82 and 83 for holding the rear end of the frame, chains 87 and 88 are used to hold the rear end of the frame and a chain 90 is used to hold the front plate 63. This type of frame may be used on a flat bed pickup truck with the same efficacy as the frame shown in FIG. 5.

In FIG. 7, a frame is shown which may be used on a stake truck. This frame consists of rectangularly arranged side members 92 and 93, end members 94 and 95, and a channel member 96 on which is the "fifth wheel" supporting standard 97. A "fifth wheel" unit 99 is pivoted at 100 on a plate 101 attached to the standard 97 and functions in the same manner as the units in the prior figures. To maintain the frame 92-95 in position on the truck bed 105, posts 106, 107, 108, and 109 are positioned in the stake holes in the bed 105 and are connected to a collar 111 by respective chains 112, 113, 114, and 115.

Thus, the invention will facilitate the use of different types of pickup trucks as the motor vehicles for semi-trailers by providing a quickly attachable and detachable "fifth wheel" frame unit to the pickup truck. Certain modifications of the connector frame unit permits at least half of the truck bed to be used for transporting materials during its use as a power vehicle for a semi-trailer.

I claim:

1. A rapidly attachable and detachable unit for a truck for coupling said truck to a trailer comprising a box-type rectangular frame having upper and lower corners and adapted to be positioned on the bed of said truck, a standard on said frame, a trailer connection element at the upper end of said standard, brace members extending from said standard to said upper corners of said frame, a longitudinally adjustable transverse member connected to said standard and adapted to be attached to the sides of said truck, means for adjusting the height of said transverse member on said standard, and adjustable means for attaching said frame to said truck in a fixed lengthwise position thereon.

2. A unit in accordance with claim 1 in which said last-mentioned means includes a pair of telescoping rods in said upper corners of said frame and adapted to abut the front panel of said truck.

3. A unit in accordance with claim 1 in which said last-mentioned means includes hook means on said frame and adapted to be attached to the end panel of said truck.

4. A unit in accordance with claim 1 in which said transverse member includes telescoping cross members attached to the sides of said truck and to said standard, said trailer-connecting element being positioned rearwardly of the axis of said standard.

5. A rapidly attachable and detachable unit for a pickup truck to couple said truck to a semi-trailer comprising a box-type rectangular frame for positioning within and supported by the bed frame of said truck, a standard on said frame, trailer connecting means on the upper end of said standard, adjustable cross members attached to said standard and adapted to be attached to and detached from the sides of said bed frame to fixely position said unit transversely of said bed frame regardless of the width thereof, means for adjusting the height of said cross members from the bed frame of said truck, and adjustable means for attaching and detaching said unit to and from the front panel lengthwise of said bed frame.

6. A unit in accordance with claim 5 in which said trailer connecting means is a "fifth wheel" pivoted plate on the upper end of said standard.

7. A unit in accordance with claim 5 in which said cross members are telescoping tubes and rods having hooks on the ends of said rods for attachment to the sides of said truck.

8. A unit in accordance with claim 5 in which said last-mentioned means are telescoping rods in said frame and parallel to the axis of said truck for positioning the ends thereof against the front panel of said bed frame.

9. A unit in accordance with claim 5 in which said last-mentioned means are height adjustable hooks on said frame for attachment to the rear end panel of said truck.

10. A unit in accordance with claim 5 in which said last-mentioned means includes a cross member attached to the forward end of said bed frame and to said standard.

References Cited by the Examiner

UNITED STATES PATENTS

| | | | |
|---|---|---|---|
| 2,366,892 | 1/45 | Donnellan | 280—423 X |
| 2,425,521 | 8/47 | Ellberg | 280—438 |
| 2,754,108 | 7/56 | Brown | 280—423 X |
| 2,925,286 | 2/60 | Hodges | 280—423 X |

OTHER REFERENCES

Goldhofer: German application 1,038,410, printed Sept. 4, 1958 (Kl 2,63c).

PHILIP ARNOLD, *Primary Examiner.*

LEO FRIAGLIA, *Examiner.*